United States Patent [19]

Dahlberg

[11] 4,387,899
[45] Jun. 14, 1983

[54] DUAL CHAMBER SEALING ELEMENT WITH HARDENING FILLER

[76] Inventor: Anders I. Dahlberg, Flyghamnsvägen 22, S-183 64 Täby, Sweden

[21] Appl. No.: 285,073
[22] PCT Filed: Nov. 6, 1980
[86] PCT No.: PCT/SE80/00276
  § 371 Date: Jul. 7, 1981
  § 102(e) Date: Jul. 7, 1981
[87] PCT Pub. No.: WO81/01452
  PCT Pub. Date: May 28, 1981

[30] Foreign Application Priority Data
Nov. 15, 1979 [SE] Sweden .................. 7909418

[51] Int. Cl.³ .................. F16J 15/46; F16L 17/02
[52] U.S. Cl. .................. 277/34.3; 277/1; 277/27; 277/226; 285/97
[58] Field of Search .................. 277/1, 3, 27, 34, 34.3, 277/34.6, 226; 285/95–97

[56] References Cited

U.S. PATENT DOCUMENTS

| | | | |
|---|---|---|---|
| 2,306,160 | 12/1942 | Freyssinet | 277/34.3 |
| 2,309,974 | 2/1943 | Miller | 277/34.3 |
| 2,506,359 | 5/1950 | Haslam | 277/34.3 |
| 2,822,192 | 2/1958 | Beatty | 277/34.3 |
| 3,642,292 | 2/1972 | Zeffer et al. | 277/34 |
| 3,695,637 | 10/1972 | Satterthwaite | 285/97 |

FOREIGN PATENT DOCUMENTS

| | | | |
|---|---|---|---|
| 241706 | 11/1962 | Australia | 277/226 |
| 1475890 | 2/1969 | Fed. Rep. of Germany | |
| 2513770 | 10/1976 | Fed. Rep. of Germany | 277/1 |
| 993384 | 5/1965 | United Kingdom | 277/1 |
| 594300 | 2/1978 | U.S.S.R. | 277/1 |

Primary Examiner—Robert S. Ward, Jr.
Attorney, Agent, or Firm—Murray and Whisenhunt

[57] ABSTRACT

A sealing element adapted to be disposed in a slitshaped, preferably annular gap, comprises an internal gas-filled cavity with an inlet in one end and an outlet in the other end for a hardening filling medium adapted to be introduced into the cavity under pressure so that the cavity is filled and the element is expanded so that the gap is sealed. The outlet (15) is connected to a closed chamber (14) adapted to receive the gas which is driven out of the cavity (2) in the flexible element when the cavity is filled with filling medium (16), so that the displaced gas can be compressed in the closed chamber (14') and exert a counter pressure on the filling medium (16') in the sealing element while the filling medium is hardening.

8 Claims, 7 Drawing Figures

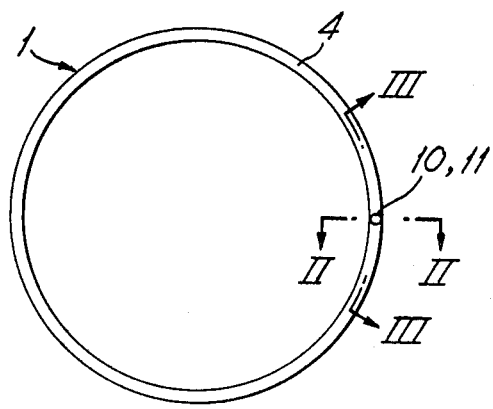
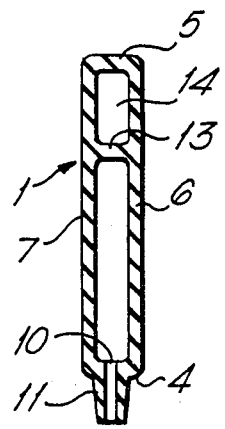
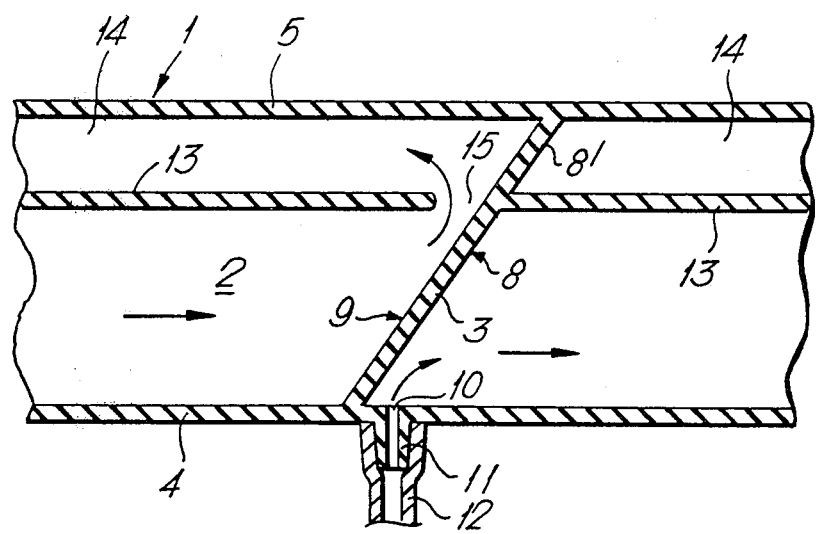

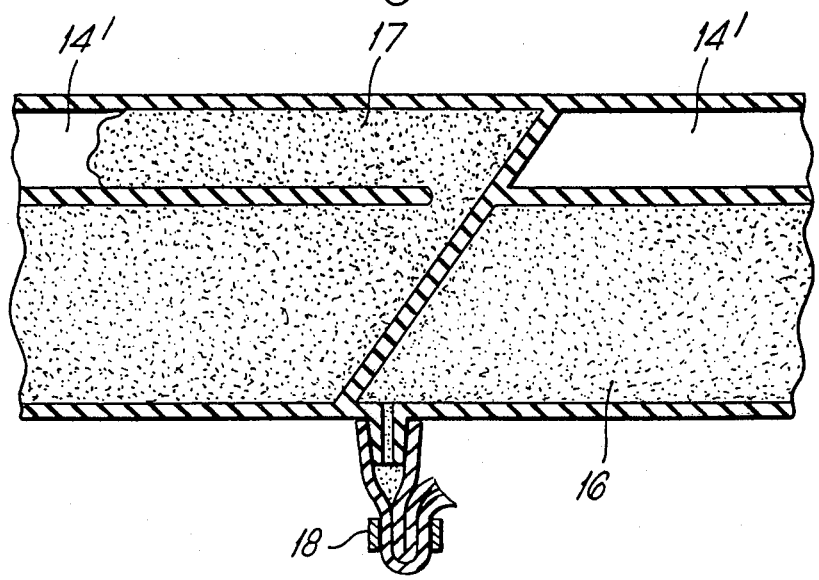
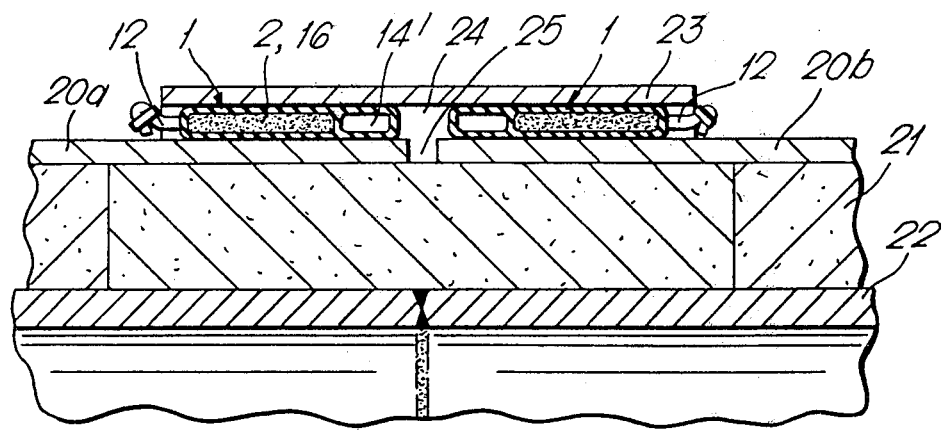

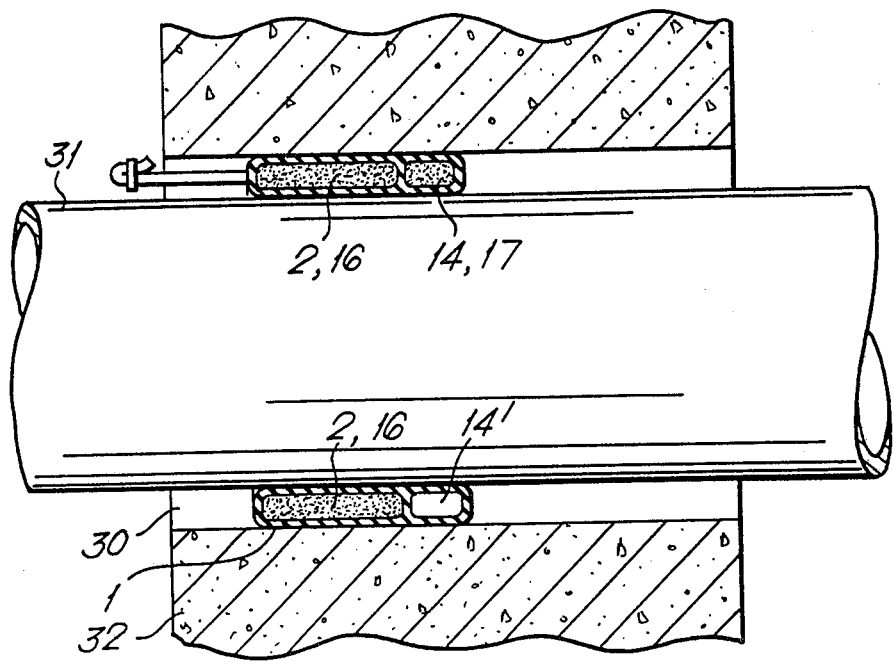
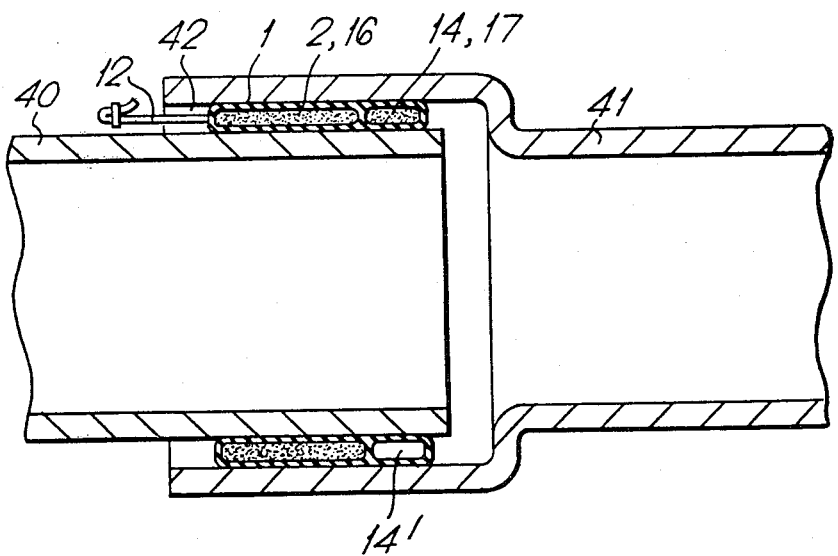

DUAL CHAMBER SEALING ELEMENT WITH HARDENING FILLER

TECHNICAL FIELD

The invention relates to a sealing element comprising a flexible member adapted to be disposed in a slit-shaped, preferably annular space. More specifically, the invention relates to a sealing element having a flexible member which comprises an internal air-filled cavity with a hardening filling medium intended to be introduced into said cavity under pressure so that the cavity is filled and the member expands so that the slit is sealed.

BACKGROUND ART

Expansible sealing elements are generally known and used to a wide extent for various purposes. It is also known to expand such sealing elements by means of a filling medium which is forced into a cavity in the element after which the filling medium can harden so that the expanded sealing shape of the sealing element is retained. Examples of elements intended to be filled with a medium which, at least on injection into the cavity, has the form of a liquid are disclosed inter alia in FR Pat. No. 835 966, FR Pat. No. 1 375 644, DE Pat. No. 1 475 890 and U.S. Pat. No. 2,760,791. In the U.S. Pat. No. 3,341,974 there is disclosed a sealing element with an encircling cavity which expands from one side of a partition round the sealing element to the opposite side of the partition. Inlets and outlets for a liquid are disposed in both end portions of the cavity, that is to say in the region adjacent to the two sides of the partition.

A limitation of the sealing elements of the general kind given above is that, in the present stage of development, they are not particularly suitable when the filling medium consists of a material with a comparatively long hardening time. This is actually a serious disadvantage because some of the filling media most suitable for other reasons consist precisely of materials with comparatively long hardening times. The reason why long hardening times constitute a problem is that the filling medium must retain excess pressure until the material has solidified completely. With forms of embodiments of sealing elements hitherto known, therefore, the pressure source cannot be uncoupled until the material has solidified, which makes handling complicated and/or involves a low productivity expressed in number of sealing elements finished per unit of time. Against this background, rapid hardening filling media have hitherto mainly been used despite the fact that these have certain definite disadvantages, inter alia from the environment point of view.

DISCLOSURE OF INVENTION

One object of the invention is to provide a sealing element which does not have the limitations indicated above. One object of the invention is thus to produce a sealing element of the kind indicated in the preamble, in which the filling medium may consist either of rapid hardening of slow hardening material, the invention offering a specific advantage particularly in the case of slow hardening material.

This and other objects and advantages can be achieved in that the cavity in the flexible member extends from the inlet such as to embrace the space which shall be sealed and thereafter continues in a closed chamber adapted to be able to receive the air which is driven out of the liquid filling medium when this is pressed into the cavity through the inlet, and preferably to be able to receive an excess quantity of filling medium so that the air in the closed chamber can be compressed and exert a counter pressure on the filling medium in the flexible member while the filling medium is solidifying. The air-filled cavity and the closed chamber may appropriately have the form of two chambers in one and the same integrating body, the two chambers being in communication with one another through an outlet from the cavity which is to be filled with the filling medium. According to a preferred form of embodiment, the chamber which consists of said closed chamber extends along at least a portion of the chamber which consists of the internal air-filled cavity which is to be filled with said filling medium. For example, the sealing element has the form of a sleeve with the two chambers arranged beside one another. According to a conceivable embodiment the two chambers may be integrated without any marked connection therebetween, such that the flexible member basically consists of a preferably flat tube which has an inlet in one end and is closed in the other end and having a length exceeding the circumferential length of the preferably annular space intended to be sealed. The closed end portion then will exceed beyond the region of the inlet, said end portion being arranged in the slit-shaped space along at least a portion of the cavity intended to be completely filled with a filling medium. According to one aspect of the invention, the two chambers are further so dimensioned in relation to one another that the counter pressure which is produced in the closed chamber when the internal cavity is completely filled with a filling medium and excess of filling medium begins to flow into said closed chamber, preferably amounts to between 0.5 and 3 atm, preferably between 1 and 2 atm.

Other aspects and advantages of the invention will be seen from the following description of a preferred form of embodiment.

BRIEF DESCRIPTION OF DRAWINGS

In the following description of a preferred form of embodiment reference is made to the accompanying figures of the drawings, of which:

FIG. 1 shows diagrammetically the sealing element according to the preferred form of embodiment in the axial direction.

FIG. 2 is a section II—II on a larger scale.

FIG. 3 is a section III—III before a filling medium is injected.

FIG. 4 shows the same part of the sealing element as FIG. 3, after the filling medium has been injected.

FIG. 5 illustrates how the sealing element can be used to seal a joint between outer pipes for insulating material for district heating pipes.

FIG. 6 illustrates how the sealing element according to the invention can be used to seal a pipe passage through a wall, and FIG. 7 shows how the sealing element can seal the joint between two pipe ends inserted one inside the other.

Only the details essential for an understanding of the invention are shown in the Figures, while other details are omitted so that the principles of the invention may be better brought out.

BEST MODE OF CARRYING OUT THE INVENTION

Referring first to FIGS. 1–3, a sealing element is generally designated by 1. The sealing element 1 consists of a substantially flat tube or sleeve of natural rubber, synthetic rubber such as silicone rubber, or of mixtures of different qualities of rubber. Certain plastics materials may also be considered. The sealing element or sleeve 1, which, according to the form of embodiment, has the contour of a circular ring, comprises an internal cavity 2 with an oblique partition 3. The partition 3 extends between the two narrow side walls 4 and 5 of the sleeve 1. The two wider side walls of the sleeve 1 are designated 6 and 7. The cavity 2 extends from one side 8 of the partition 3. In other words, the two sides 8 and 9 of the partition 3 constitute the two ends of the cavity 2 which extends through the whole sleeve. In the one narrow side wall 4, an inlet 10 is formed near the side 8 of the partition 3, the side 8 of the partition 3 forming a narrow angle to the narrow side wall 4 of the cavity 2 in the region of the inlet 10. The opposite side 9 of the partition 3 hence forms an oblique angle to the side wall 4. A nipple-shaped projection is designated 11, while a flexible tube for the supply of a filling medium, connected to the nipple 11 is designated 12.

At the side of the cavity 2 and separated from this by a longitudinal partition 13, parallel with the narrow side walls 4 and 5, there is disposed another cavity 14. As can be seen from FIGS. 2 and 3, the two chambers 2 and 14 are thus disposed beside one another, extending parallel between the sides 8, 8' and 9 of the transverse partition 3. The cavity between the longitudinal partition 13 and the narrow outer wall 5 is also called "the closed chamber", because this chamber only has an inlet 15 but no outlet. Thus the chambers 2 and 14 communicate with one another through the passage 15 which at the same time constitutes an outlet for a filling medium from the internal cavity 2 to the closed chamber 14. According to this form of embodiment, the internal cavity 2 has a considerably larger volume than the closed chamber 14.

When the sealing element—the sleeve 1—is used, the sleeve is disposed in the gap which is to be sealed. After this, a hardening filling medium is introduced through the flexible tube 12 into the internal cavity 2, in the part of said cavity which is bounded by the side 8 of the partition 3. The filling medium, which is designated 16 in FIG. 4, is pressed round the whole sleeve into the internal cavity 2 until the filling medium meets the opposite side 9 of the partition 3. After that, the internal cavity 2 is completely filled with filling medium 16 and the wide walls 6 and 7 have moved away from one another through expansion of the internal cavity 2 as a result of the pressure which the filling medium develops. When the internal cavity 2 is completely full, an excess quantity of filling medium is also forced into the closed chamber 14 through the passage 15 and is for this purpose guided towards the passage 15 by the sloping wall 9 of the partition 3 such that any gas-filled pocket will not remain in the cavity 2. The excess quantity of filling medium forced into chamber 14 is designated 17 in FIG. 4. The conveying path of the filling medium is marked by arrows, FIG. 3.

The internal cavity 2 like the closed chamber 14 is at the start filled with a gas, normally air. All this gas in the internal cavity 2 is forced into the closed chamber 14. More specifically, the gas is forced into that part 14' of the chamber 14 which is not filled with the excess quantity of filling medium 17. Thus an ever increasing gas pressure develops in the inner part 14' of the closed chamber 14. The injection of the filling medium 16 may appropriately continue until the counter pressure in the inner part 14' of the closed chamber 14 substantially corresponds to the applied pressure in the supply tube 12. After this, the supply of further filling medium is broken off. The tube 12 is closed by means of a clip 18 or the like, after which the tube 12 can be cut off at the opposite side of the clip 18. A hardening epoxy or acrylic resin which develops heat during the solidification is preferably used as a filling medium. This means that the pressure in the space 14' further increases during the solidification process, so that a guarantee can be afforded for the fact that the expanding, sealing shape of the sealing element 1 is retained during the whole of the hardening phase, so that the sealing shape of the sleeve 1 becomes permanent.

FIG. 5 illustrates how a pair of sealing sleeves 1 according to the invention is used to seal a joint between a pair of outer pipes 20a and 20b for insulating material 21 for a district heating pipe 22. The insulating material 21 may consist, for example, of a cellular plastics material in the form of polyurethane foam. The district heating pipe 22 consists of steel, while the outer pipes 20a and 20b consists of polyethylene of hard quality. A coupling sleeve 23 also consists of polyethylene. The sealing sleeves 1 are disposed in a gap 24 between the coupling sleeve 23 and the pipes 20a and 20b. FIG. 5 illustrates the situation when the sealing sleeves 1 have expanded so that the gap 24 has been sealed at both sides of the joint 25 between the pipes 20a and 20b. In this position, when the filling in the internal cavity 2 has hardened, the sealing sleeves constitute permanent seals of the gap 24 at each side of the joint 25.

FIG. 6 illustrates in a corresponding manner how a sealing sleeve 1 seals a passage 30 for a pipe 31 through a wall 32.

FIG. 7 illustrates a further example of an application. The Figure shows an axial section through a joint between two pipes 40 and 41 which are introduced one inside the other. In this case, a sealing sleeve 1 seals the gap 42 between the two pipes 40 and 41.

I claim:

1. A sealing element comprising a flexible member adapted to be desposed in a slit-shaped, preferably annular space, which member comprises an internal gas-filled cavity with an inlet on one end for a hardening filling medium intended to be introduced into said cavity under pressure so that the cavity is filled and the member expands so that the gap is sealed, characterized in that the cavity (2) in the flexible member extends from the inlet (10) such as to embrace the space (24, 30, 42) which shall be sealed and thereafter continues in a closed chamber (14) adapted to receive the gas which is driven out of said cavity (2) in the flexible member when the cavity (2) is filled with filling medium (16), so that the displaced gas can be compressed in the closed chamber (14') and exert a counter pressure on the filling medium (16') in the flexible member while the filling medium is hardening.

2. A sealing element as claimed in claim 1, characterized in that the closed chamber (14) extends along at least a portion of the internal gas-filled cavity (2) intended completely to be filled with a filling medium.

3. A sealing element as claimed in one of the claims 1 and 2, characterized in that the element 1 has the form of a sleeve with the two chambers (2, 14) arranged beside one another.

4. A sealing element as claimed in one of the claims 1 or 2, characterized in that the two chambers are so dimensioned in relation to one another that the gas pressure which is developed in the closed chamber when the filling medium begins to penetrate, is preferably between 0.5 and 3 atm, preferably between 1 and 2 atm.

5. A sealing element as claimed in one of the claims 1 or 2, characterized in that said internal gas-filled cavity (2) and said closed chamber (14) which is adapted to receive the displaced gas to provide a counter pressure, constitute two chambers, communicating with one another through a passage (15), in one and the same integrated body.

6. A sealing element as claimed in one of the claims 1 or 2, characterized by a partition (3) the two walls (8, 9) of which constitute the two end walls of said cavity (2), said inlet (10) being provided in a narrow side wall (4) of the cavity adjacent to said partition (3), the side wall (8) of the partition (3) forming a narrow angle to said narrow wall of said cavity (2) in the region of the inlet (10), and the opposite side wall (9) of the partition (3) forming an oblique angle to the same narrow side wall (4) of cavity (2).

7. A sealing element as claimed in claim 6, characterized in that said passage (15) is provided adjacent to said opposite side wall (9) of the partition (3) in the narrow angle between said side wall (9) and a second narrow side wall (13) opposite to said first side wall (4).

8. A sealing element as claimed in claim 7, characterized in that said second narrow side wall (13) is a partition between said cavity (2) and said closed chamber (14).

* * * * *